United States Patent
Dsylva et al.

(10) Patent No.: US 12,243,142 B2
(45) Date of Patent: Mar. 4, 2025

(54) TOUCH ANIMATION DISPLAY METHOD AND APPARATUS, DEVICE, AND MEDIUM

(71) Applicant: LEMON INC., Grand Cayman (KY)

(72) Inventors: Stacey Dsylva, London (GB); Qiang Chen, Beijing (CN); Alessandro Fantini, London (GB); Harald Buchmann, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/534,233

(22) Filed: Dec. 8, 2023

(65) Prior Publication Data

US 2024/0104821 A1    Mar. 28, 2024

Related U.S. Application Data

(63) Continuation of application No. PCT/SG2022/050292, filed on May 10, 2022.

(30) Foreign Application Priority Data

Jun. 9, 2021 (CN) .......................... 202110642704.9

(51) Int. Cl.
*G06T 13/40* (2011.01)
*G06F 3/04883* (2022.01)
(Continued)

(52) U.S. Cl.
CPC .......... *G06T 13/40* (2013.01); *G06F 3/04883* (2013.01); *G06T 7/73* (2017.01);
(Continued)

(58) Field of Classification Search
None
See application file for complete search history.

(56) References Cited

U.S. PATENT DOCUMENTS

| 2010/0083148 A1* | 4/2010 | Finn ........................ A63F 13/12 715/764 |
| 2021/0029305 A1 | 1/2021 | Tang et al. |

FOREIGN PATENT DOCUMENTS

| CN | 110917623 A | 3/2020 |
| CN | 111077984 A | 4/2020 |

(Continued)

OTHER PUBLICATIONS

Machine Translation CN111475573A (Year: 2020).*
(Continued)

*Primary Examiner* — Peter Hoang
(74) *Attorney, Agent, or Firm* — Alleman Hall & Tuttle LLP

(57) ABSTRACT

The embodiment of the disclosure relates to a touch animation display method and apparatus, device, and medium, wherein the method includes the following steps: identifying a human body key point position on a human body in an existing video frame; according to a predetermined motion mode, acquiring a display position of a target object in the existing video frame; according to the human body key point position and the display position, judging whether a preset touch condition is satisfied; if the touch condition is satisfied, adjusting a motion mode of the target object according to a target key point position. Therefore, by displaying the target object in the video frame, the touch motion during interaction with a user is simulated in real time, the interestingness of video display is improved, and the user's interaction experience is improved.

15 Claims, 7 Drawing Sheets

(51) Int. Cl.
  *G06T 7/73* (2017.01)
  *G06V 10/25* (2022.01)
  *G06V 40/16* (2022.01)
(52) U.S. Cl.
  CPC ............ *G06V 10/25* (2022.01); *G06V 40/172* (2022.01); *G06V 2201/07* (2022.01)

(56) References Cited

FOREIGN PATENT DOCUMENTS

| | | | | |
|---|---|---|---|---|
| CN | 111475573 A | * | 7/2020 | ........... A63F 13/537 |
| CN | 112200893 A | | 1/2021 | |
| CN | 112287866 A | | 1/2021 | |
| EP | 3726843 A1 | | 10/2020 | |

OTHER PUBLICATIONS

Sra et al. "MetaSpace II: Object and full-body tracking for interaction and navigation in social VR;" 2015; arXiv preprint arXiv:1512.02922; pp. 1-10 (Year: 2015).*
Han et al.; "VITON: An image-Based Virtual Try-On Network;" Proceedings of the IEEE Conference on Computer Vision and Pattern Recognition (CVPR), 2018, pp. 7543-7552 (Year: 2018).*
European Patent Office, Extended European Search Report Issued in Application No. 22820665.2, Apr. 26, 2024, 9 pages.

* cited by examiner

TOUCH ANIMATION DISPLAY METHOD AND APPARATUS, DEVICE, AND MEDIUM

CROSS REFERENCE TO RELATED APPLICATIONS

The present application is a continuation of International Patent Application No. PCT/SG2022/050292, filed on May 10, 2022, which claims priority of Chinese Patent Application No. 202110642704.9, filed on Jun. 9, 2021, and the entire content disclosed by the Chinese patent application is incorporated herein by reference as part of the present application.

TECHNICAL FIELD

The present disclosure relates to the technical field of video display, in particular to a touch animation display method, an apparatus, a device, and a medium.

BACKGROUND

With the rise of short video applications, users have increasingly strong demands for interestingness of the short video applications, and the interestingness of the short video applications also becomes an important standard to measure its competitiveness.

In related technologies, in order to improve the interestingness of the short video applications, various post video editing props are provided. The users may edit videos by selecting the video editing props, such as the users may add stickers to the videos by selecting a sticker prop.

However, the modes mentioned above for improving the interestingness of the videos are all post editing of the videos, and there is also no good interaction with the users. The real-time and interestingness of video editing is relatively poor.

SUMMARY

In order to solve the above technical problems or at least partially solve the above technical problems, the present disclosure provides a touch animation display method, an apparatus, an electronic device, and a computer-readable storage medium, which may improve the real-time and interestingness of video editing.

The disclosure provides a touch animation display method, the method comprises: identifying a human body key point position on a human body in an existing video frame; according to a predetermined motion mode, acquiring a display position of a target object in the existing video frame; according to the human body key point position and the display position, judging whether a preset touch condition is satisfied; and if the touch condition is satisfied, adjusting a motion mode of the target object according to a target key point position, the target key point position is the human body key point position that satisfies the touch condition.

The disclosure also provides a touch animation display apparatus, the apparatus comprises: an identifying module, used to identify a human body key point position on a human body in an existing video frame; an acquiring module, used to, according to a predetermined motion mode, acquire a display position of a target object in the existing video frame; a judging module, used to, according to the human body key point position and the display position, judge whether a preset touch condition is satisfied; and a trail adjusting module, used to adjust a motion mode of the target object according to a target key point position when the touch condition is satisfied, wherein the target key point position is the human body key point position that satisfies the touch condition The disclosure also provides an electronic device, the electronic device comprises: a processor; and a memory used to store an executable instruction of the processor; wherein the processor is used to read the executable instruction from the memory and execute the instruction to achieve the touch animation display method provided by the embodiment of the present disclosure.

The disclosure also provides a computer-readable storage medium, the storage medium stores a computer program, and the computer program is used to execute the touch animation display method provided by the embodiment of the present disclosure.

Compared to existing technologies, technical schemes provided in embodiments of the present disclosure have the following advantages:

The touch animation display method provided in the embodiments of the present disclosure identifies a human body key point position on a human body in an existing video frame; according to a predetermined motion mode, acquires a display position of a target object in the existing video frame; according to the human body key point position and the display position, judges whether a preset touch condition is satisfied; and if the touch condition is satisfied, adjusts a motion mode of the target object according to a target key point position. Therefore, by displaying the target object in the video frame, the touch motion during interaction with a user is simulated in real time, the interestingness of video display is improved, and the user's interaction experience is improved.

BRIEF DESCRIPTION OF THE DRAWINGS

The above and other features, advantages, and aspects of each embodiment of the present disclosure may become more apparent in combination with drawings and with reference to the following specific implementation modes. In the drawings throughout, same or similar drawing reference signs represent same or similar elements. It should be understood that the drawings are schematic, and originals and elements may not necessarily be drawn to scale.

FIG. 5(*b*) is a schematic diagram of another touch animation display scene provided in an embodiment of the present disclosure;

DETAILED DESCRIPTION

Figure 1:
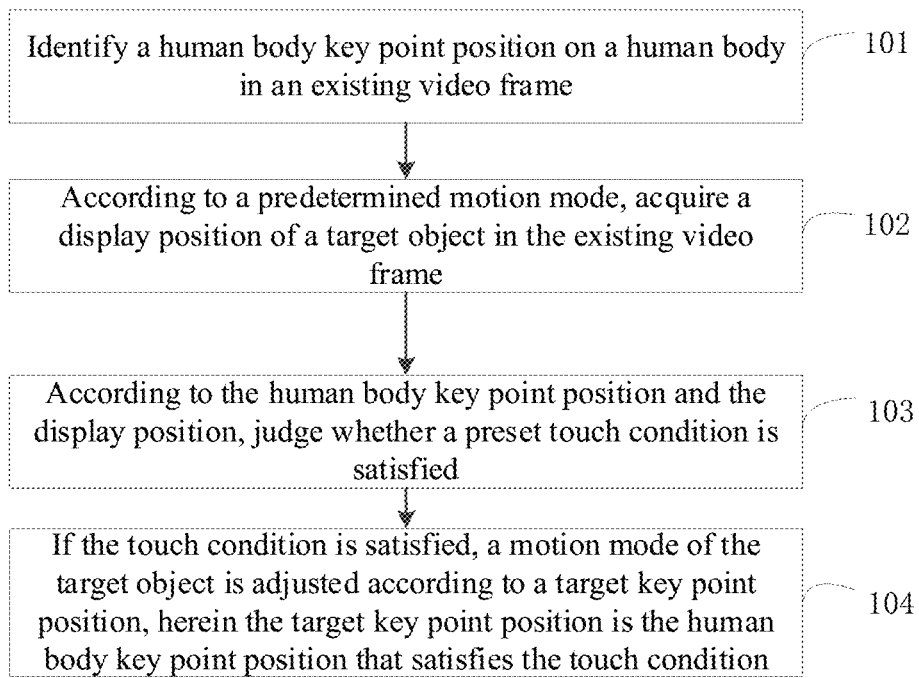
FIG. 1 is a flow schematic diagram of a touch animation display method provided in an embodiment of the present disclosure.

Embodiments of the present disclosure may be described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more thoroughly and completely. It should be understood that the drawings and embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited to this aspect.

The term "including/comprising" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

Names of messages or information interacted between more apparatuses in the implementation modes of the present disclosure are only for descriptive purposes and are not intended to limit the scope of these messages or information.

In order to solve the above problems, an embodiment of the present disclosure provides a touch animation display method, and this method is described below in combination with the specific embodiments.

FIG. 1 is a flow schematic diagram of a touch animation display method provided in an embodiment of the present disclosure. The method may be performed by a touch animation display apparatus, herein the apparatus may be achieved by using software and/or hardware and may generally be integrated into an electronic device. As shown in FIG. 1, the method includes:

Step 101, a human body key point position on a human body in an existing video frame is identified.

Herein, the human body key point position may be all joint point positions on the human body, or may be a part of pre-assigned joint point positions. Certainly, the key point may be not only the joint point, but also any other designated position points on the human body, such as a tiptoe position point, a head top position point, and a knee position point, it is not limited here. The human body key point position in this embodiment may be a two-dimensional coordinate, or may be a three-dimensional coordinate.

In this embodiment, the human body key point position on the human body in the existing video frame is identified, herein if there is not a human body image in the existing video frame, a prompt message may also be sent, such as "please keep the human body in view" is displayed in a pop-up window in the existing video frame, so that the human body may be identified in the existing video frame.

It should be noted that in different application scenes, the modes of identifying the human body key point position on the human body in the existing video frame are different, as shown in the following examples:

In an embodiment of the present disclosure, a deep learning model is obtained by pre-training according to a large amount of sample data, an input of the deep learning model is the human body image, and an output is the human body key point position on the human body image. Therefore, the existing video frame may be input into the deep learning model, to obtain the corresponding human body key point position.

In another embodiment of the present disclosure, based on an image semantic identification algorithm, semantic information of a human body pixel point in the existing video frame is identified, a pixel point corresponding to a human body key point is determined according to the semantic information, and a pixel coordinate of the corresponding pixel point is identified as the human body key point position according to an image identification algorithm.

Step 102, according to a predetermined motion mode, a display position of a target object in the existing video frame is acquired.

The target object in this embodiment may be obtained by identifying a facial image of an existing human body, and matching with a preset database according to the facial image, and typically, the database stores the target object corresponding to each pre-obtained facial image; and the target object in this embodiment may also be obtained by identifying a scene type in which a user is located at present, and querying a preset database according to the scene type, herein the preset database stores the target object corresponding to the scene type, for example, when the scene type is a grass lawn, a target object corresponding to the grass lawn is a football.

Herein, the target object in this embodiment may be an image of any body. In some possible embodiments, in order to further improve the authenticity of video display, the target object may come from scanning a real body, namely in this embodiment, in response to the user's request to take a photo of a target body, a target image of the target body may be taken, herein the target body may be the real body such as a football, a basketball, a vase, and an apple, and an image area in which the target body is located in the target image is extracted as the target object.

Figure 2:
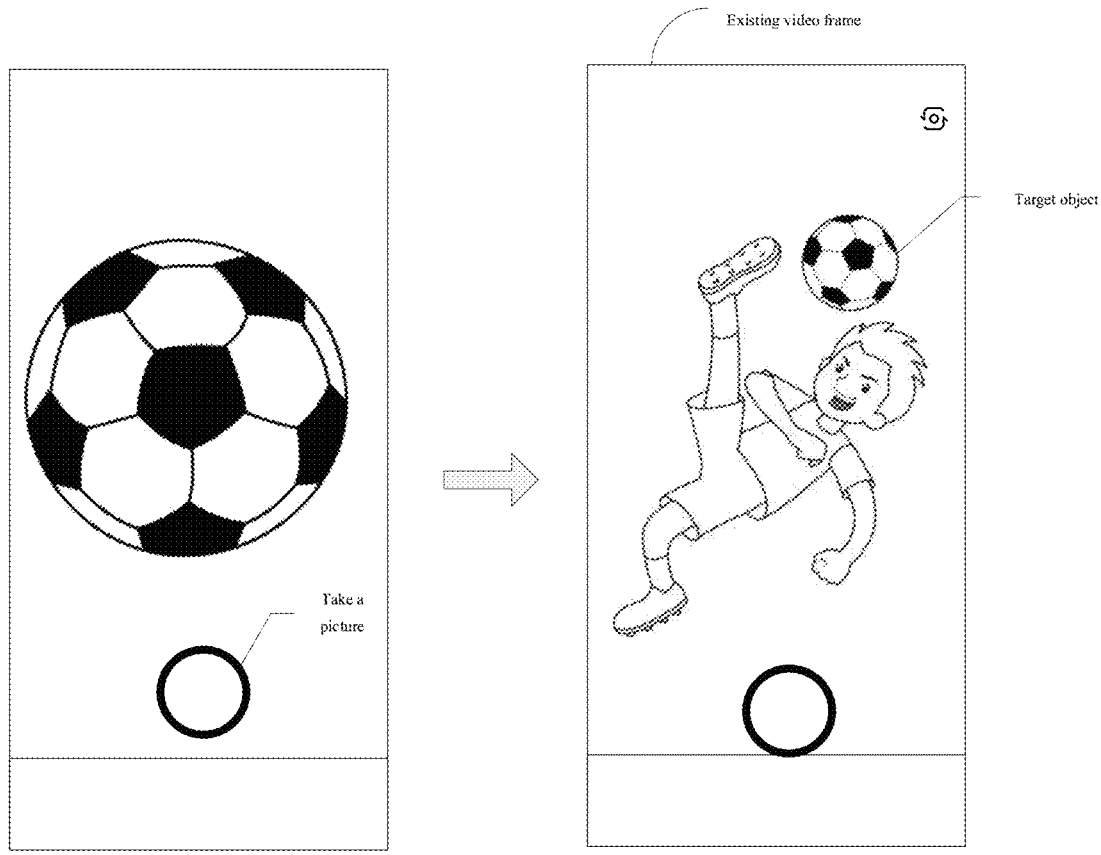
FIG. 2 is a schematic diagram of a touch animation display scene provided in an embodiment of the present disclosure.

For example, as shown in FIG. 2, when the target body is the football, the target object obtained by scanning is an image corresponding to the football. Therefore, referring to FIG. 2, the image of the real football is displayed in the existing video frame, and when the user interacts with the football, the image of the football is obtained by scanning the real football. Therefore, there is no need for the user to actually play football, it may create a user playing effect. For example, when the user is on the grass lawn, a video of playing football may be shot without actually having a football.

In addition, the predetermined motion mode may be understood as one or more parameters used to control the motion of the target object, such as a motion speed, a motion trail, and a motion direction. When there is a touch in the previous video frame, the touch motion mode is simulated, and when there is not a touch in the previous video frame, or after the simulation of the touch motion mode is completed, a default contactless motion mode is simulated.

Generally speaking, the motion mode includes the motion direction, the motion speed, the motion rail and the like of the target object. Therefore, in this embodiment, the display position reached by the motion mode in the existing video frame may be calculated according to a display time interval between image frames and the like. The display position in this embodiment may be two-dimensional or three-dimensional, this depends on whether the motion trail and the like corresponding to the predetermined motion mode is two-dimensional or three-dimensional.

Figure 3:
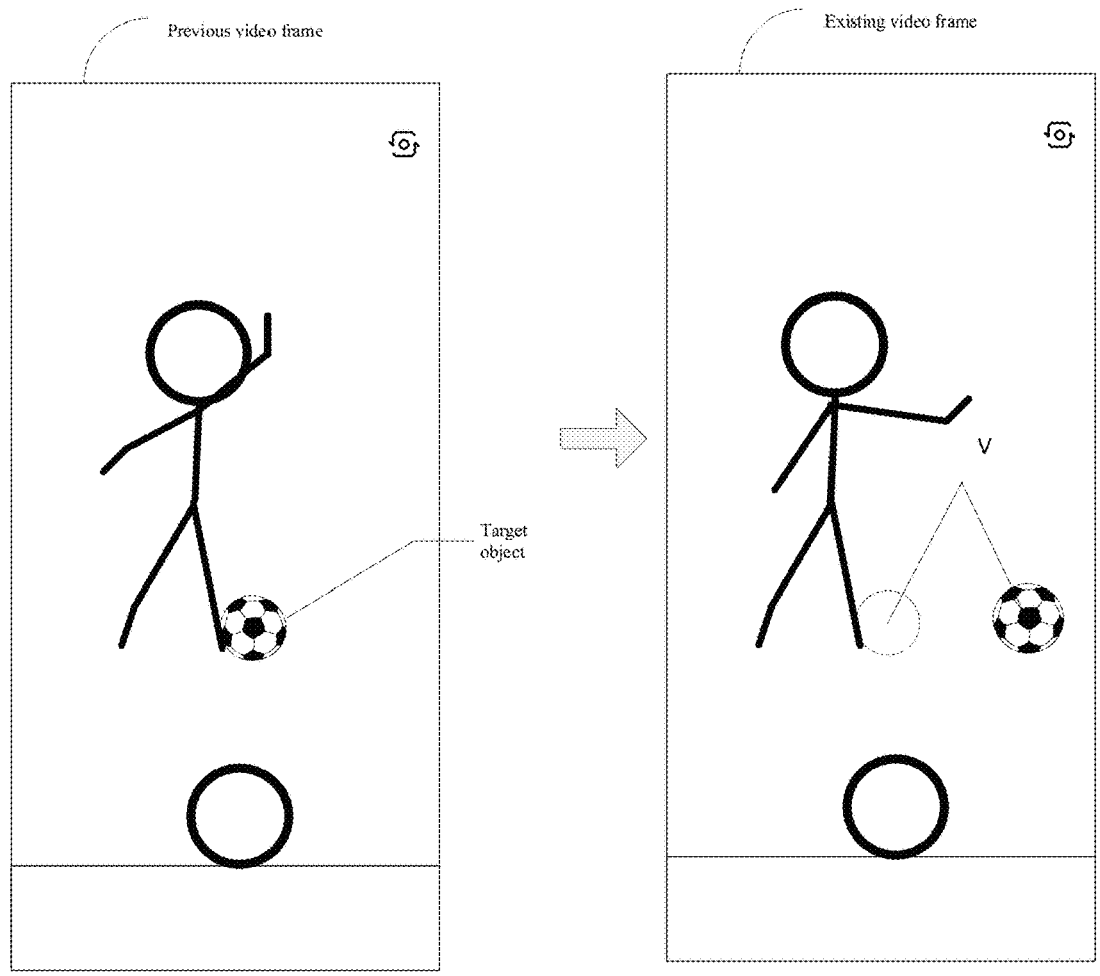
FIG. 3 is a schematic diagram of another touch animation display scene provided in an embodiment of the present disclosure.

For example, as shown in FIG. 3, when the display time interval between the image frames is 1 millisecond, it is determined according to the predetermined motion mode that the target object moves along a preset motion path at a speed of v from the previous video frame to the existing video frame, then the display position in the existing video frame may be determined by the displacement v along the preset motion path is within 1 millisecond.

Step 103, according to the human body key point position and the display position, it is judged whether a preset touch condition is satisfied.

In this embodiment, in order to simulate the touch motion, it is necessary to judge whether the preset touch condition is satisfied according to the human body key point position and the display position, and the mode of judging whether the preset touch condition is satisfied may be described in detail in subsequent embodiments, it is not repeatedly described here.

Step 104, if the touch condition is satisfied, a motion mode of the target object is adjusted according to a target key point position, herein the target key point position is the human body key point position that satisfies the touch condition.

In this embodiment, if the touch condition is satisfied, the motion mode of the target object is adjusted according to the target key point position that satisfies the touch condition, herein the target key point position that satisfies the touch condition corresponds to the human body key point position that satisfies the touch condition.

In this embodiment, the motion mode of the target object is adjusted according to the target key point position that satisfies the touch condition, the touch motion may be simulated in a subsequent video frame, and the touch interaction between the user and the target object may be intuitively displayed, thus the interestingness of the video is improved.

Figure 4:
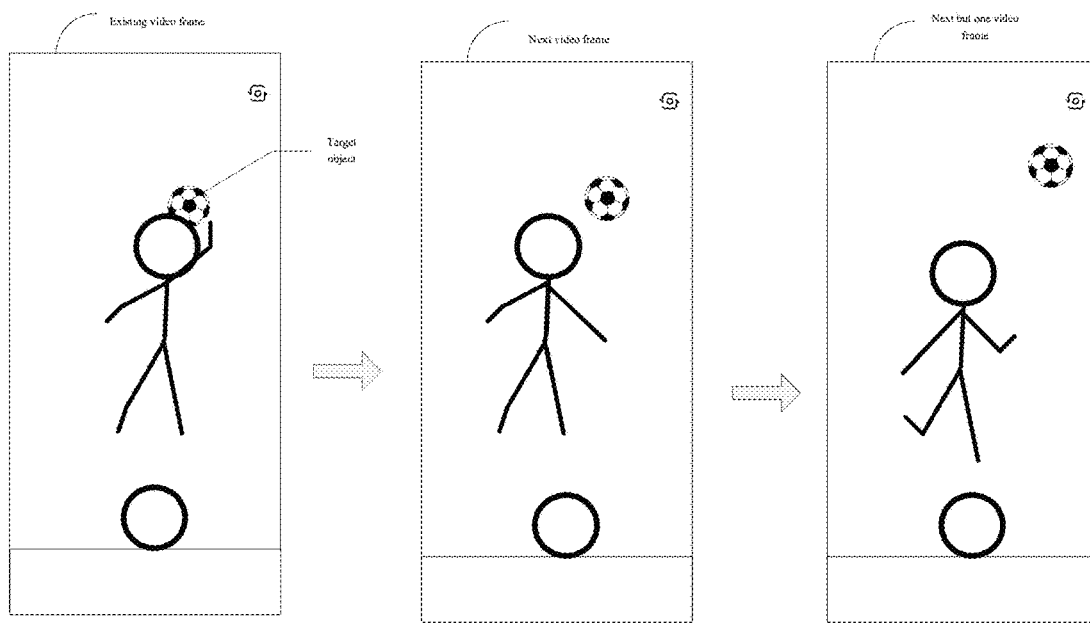
FIG. 4 is a schematic diagram of another touch animation display scene provided in an embodiment of the present disclosure.

For example, as shown in FIG. 4, when the target object is the football and the target key point position that satisfies the touch condition is a head top of the human body, when it is required to satisfy the touch condition with the head top, the football no longer moves subsequently according to the previously determined motion mode (such as it moves according to a motion trail of a free falling body), but a touch motion with the head top is simulated, the touch motion of the football and the head top may be intuitively displayed in the video.

In an embodiment of the present disclosure, if the touch condition is not satisfied, the target object is controlled to move continuously according to the previously determined motion mode, and the touch motion is not simulated.

In conclusion, the touch animation display method provided in the embodiments of the present disclosure identifies the human body key point position on the human body in the existing video frame; according to the predetermined motion mode, acquires the display position of the target object in the existing video frame; according to the human body key point position and the display position, judges whether the preset touch condition is satisfied; and finally, if the touch condition is satisfied, adjusts the motion mode of the target object according to the target key point position that satisfies the touch condition. Therefore, by displaying the target object in the video frame, the touch motion during interaction with the user is simulated in real time, the interestingness of video display is improved, and the user's interaction experience is improved.

As mentioned above, in different application scenes, there are different modes to determine whether the preset touch condition is satisfied according to the human body key point position and the display position. Examples are described as follows:

In an embodiment of the present disclosure, it is determined whether the human body key point position is coincided with the display position, namely in this embodiment, when the human body key point position and the display position are both two-dimensional pixel coordinates, it may be determined whether the human body key point position is coincided with the display position according to whether the pixel coordinates of the two are the same or the distance is less than a preset threshold (the preset threshold here is set to reduce a pressure of calculation accuracy, and usually when the distance between the human body key point position and the display position is less than the preset threshold, the two are coincided visually).

Similarly, when the human body key point position and the display position are both three-dimensional pixel coordinates, it may be determined whether the human body key point position is coincided with the display position according to whether the pixel coordinates of the two are the same or the distance is less than the preset threshold, and when the human body key point position and the display position are both the three-dimensional pixel coordinates, the simulation is more realistic, and touch simulation without a real object may be achieved, even if there is not a body corresponding to the target object, it may also simulate the touch interaction between the human body and the real object.

In this embodiment, referring to FIG. 4, as long as the human body key point position is coincided with the display position, the corresponding touch motion may be simulated. However, when the human body key point position and the display position are both the two-dimensional pixel coordinates, even if the coordinates of the two are coincided, direct touch simulation may not have a strong sense of reality when the human body is far from a camera. For example, when the user is 1 meter away from the camera, but the target object is displayed according to the predetermined trail, the effect may be 20 centimeters away from the camera. At this time, the two clearly have an impossible feeling of touch. At this moment, the coordinates of the two are coincided, namely the touch simulation does not have a strong sense of reality.

Therefore, in some possible embodiments, in order to further improve the sense of reality of the touch simulation, the touch motion simulation may also be performed in combination with a human body posture.

Namely in this embodiment, the human body posture in the existing video frame is identified, and the human body posture may be a human body action and the like. In this embodiment, positions of all joints in the human body may be identified, and the human body posture is determined according to the joint positions, or the existing video frame may be input into a pre-constructed deep learning model, to obtain the human body posture output by the deep learning model.

In this embodiment, only after the existing human body posture belongs to a preset human body posture, it may be judged whether the human body key point position and the display position satisfy the preset touch condition, and the human body posture may be a posture corresponding to a motion action such as a running posture, a kicking posture, and a jumping posture. Therefore, when the user's human body posture belongs to the motion posture, after the human body key point position that satisfies the touch condition is determined, the sense of reality of the motion simulation is stronger.

Figure 5A:
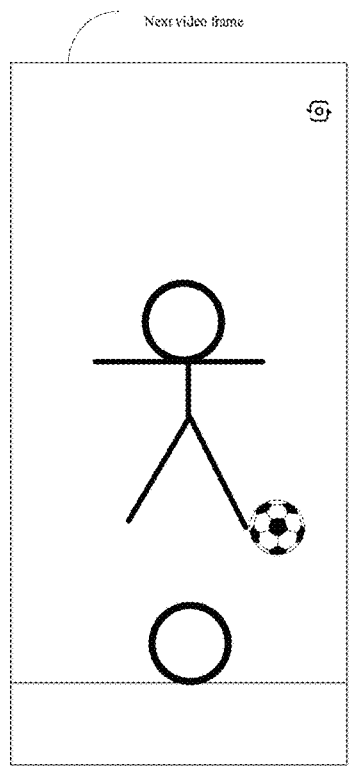
FIG. 5(*a*) is a schematic diagram of another touch animation display scene provided in an embodiment of the present disclosure.

For example, as shown in FIG. 5(a), when the target object is the football and the human body key point position that satisfies the preset touch condition is a tiptoe, the touch simulation is performed when the football falls on the user's tiptoe. At this moment, the user stands without motion, it is apparent that the sense of reality is not strong.

Figure 5B:
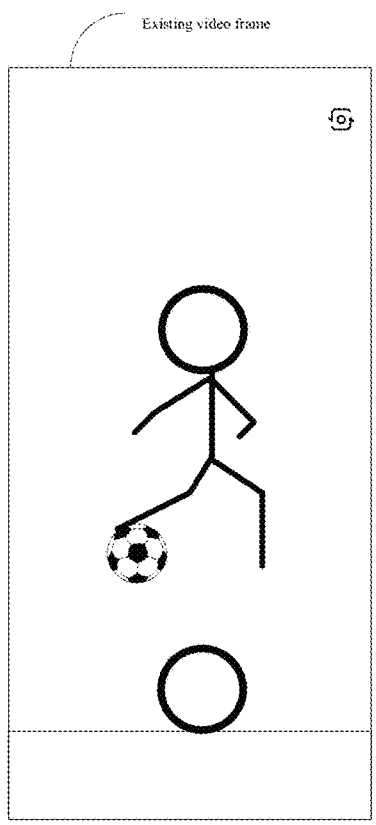

As shown in FIG. 5(b), when the target object is the football and the human body posture is the kicking posture, when the user's tiptoe touches the corresponding football, the touch simulation is performed, it apparently has the sense of reality for the user kicking the football.

In another embodiment of the present disclosure, in order to further improve the interestingness of video display, a contactless touch may be achieved, to achieve a video effect of controlling the motion mode by space separation.

In this embodiment, a touch area range corresponding to each target key point is set, and the touch area range may be a circular area set by using the target key point as a circle center and using a certain radius as a circumference, herein the radius corresponding to the target key point may be set according to the key point type of the target key point. For example, when the target key point is a fingertip, the corresponding radius is relatively small, and when the target key point is the head top, the corresponding radius is relatively large.

Therefore, once it is detected that the distance between the display position and the human body key point position is less than or equal to the radius corresponding to the target key point, it is determined that the corresponding target key point satisfies the preset touch condition, the radius is larger, and the sensitivity to the touch is higher. For example, for the above example, when the distance from the head top is relatively far, the target object simulates the touch motion, and the sensitivity to the touch is higher; and when the distance is relatively close, the target object simulates the touch motion, and the sensitivity to the touch is lower, an effect of interestingness display is formed, and a visual effect of different target key points with different "defense forces" is formed.

Figure 6:
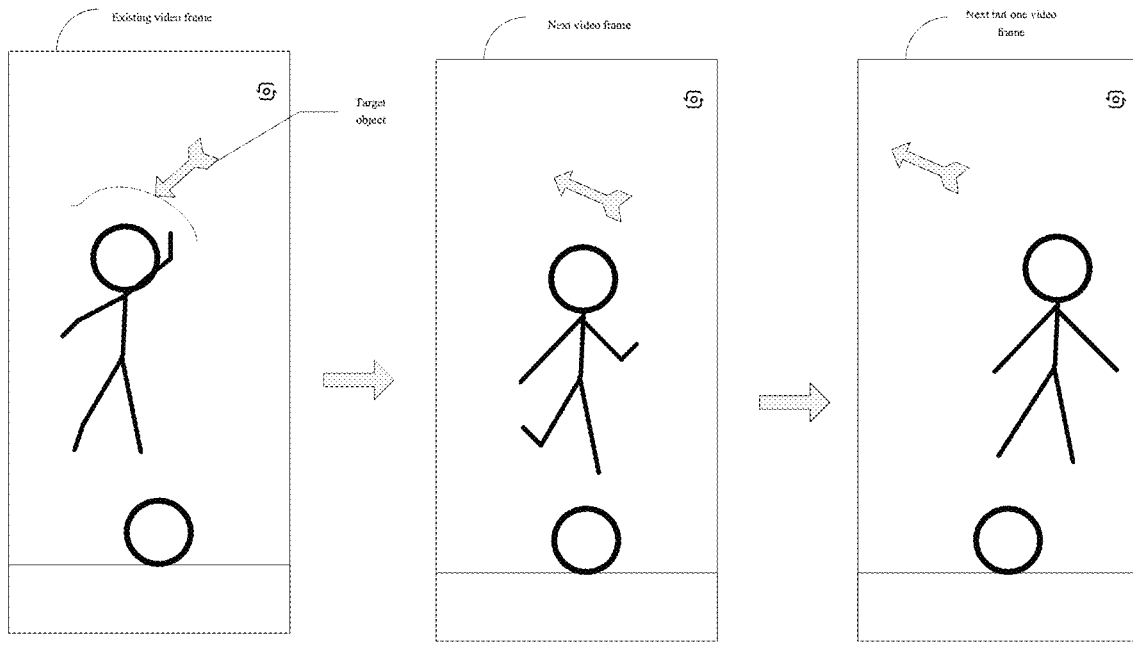
FIG. 6 is a schematic diagram of another touch animation display scene provided in an embodiment of the present disclosure.

For example, referring to FIG. 6, when the human body key point position includes the head top, the radius corresponding to the head top is 5, and the target object is an "arrow", when it is detected that the distance between the "arrow" and the head top is less than or equal to 5, the "arrow" is directly controlled to simulate the touch trail motion, to form a visual effect of being bounced by a "protection cover" on the head top.

In conclusion, the touch animation display method in the embodiments of the present disclosure flexibly determines a preset touch condition according to the need of the scene, satisfies different touch simulation effects, satisfies various visual interestingness needs, and improves the interaction sense between the user and the video.

In the actual executive process, in order to satisfy the interestingness of the video, the modes of adjusting the motion mode of the target object according to the target key point position that satisfies the touch condition are also different in the different scenes, examples are described as follows:

In an embodiment of the present disclosure, the preset touch condition is determined by combining the human body posture and the target key point position that satisfies the touch condition in one of the above examples.

Figure 7:
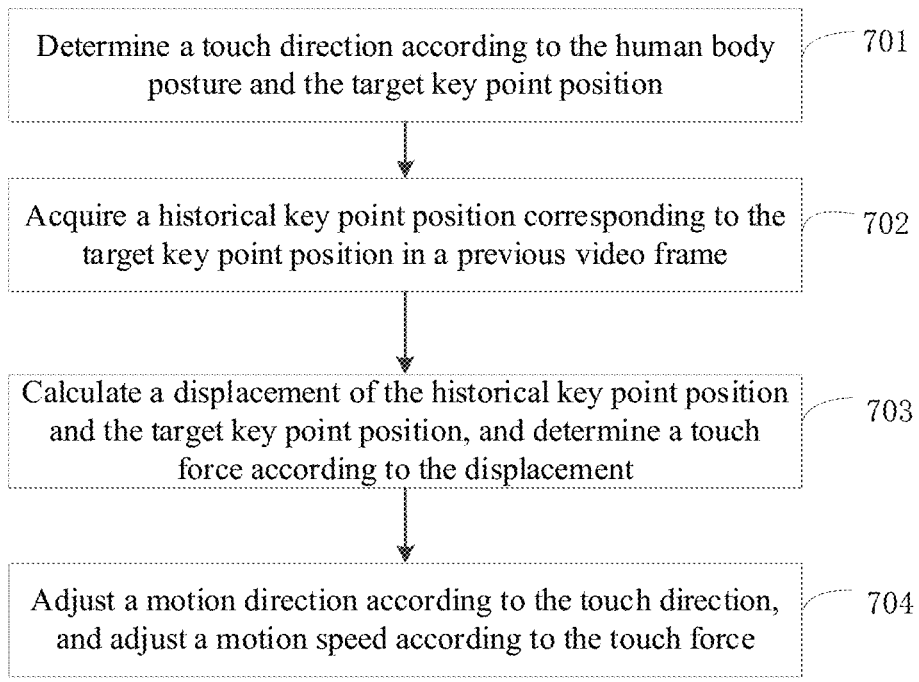
FIG. 7 is a flow schematic diagram of another touch animation display method provided in an embodiment of the present disclosure.

As shown in FIG. 7, the step of adjusting the motion mode of the target object according to the target key point position that satisfies the touch condition includes:

Step 701, a touch direction is determined according to the human body posture and the target key point position.

In this embodiment, since the target key point position is the same, the touch direction may not necessarily be the same. Therefore, in order to accurately determine the touch direction, the touch direction is determined according to the human body posture and the target key point position. For example, when the target key point is the tiptoe, the human body posture is a "kicking posture" and a "raising leg" posture, it is apparent that the touch direction is different.

In some possible examples, a deep learning model may be pre-trained, to obtain the touch direction corresponding to the human body posture and the target key point position according to the deep learning model.

Step 702, a historical key point position corresponding to the target key point position in a previous video frame is acquired.

Step 703, a displacement of the historical key point position and the target key point position is calculated, and a touch force is determined according to the displacement.

In this embodiment, even with the same human body posture and target key point position, the touch force may not necessarily be the same. Therefore, in this embodiment, the historical key point position corresponding to the target key point position in the previous video frame is acquired, the displacement of the historical key point position and the target key point position is calculated, and the touch force is determined according to the displacement. Typically, the displacement is larger, and the corresponding touch force is greater.

Step 704, a motion direction is adjusted according to the touch direction, and a motion speed is adjusted according to the touch force.

In this embodiment, the motion direction of the motion mode is adjusted according to the touch direction, namely the motion direction in the motion mode is adjusted to a motion direction of the target object changed correspondingly along a time change under the corresponding touch direction. The motion speed of the motion mode is adjusted according to the touch force, namely the motion speed is adjusted to a motion speed of the target object changed correspondingly along the time change under the corresponding touch force.

Figure 8:
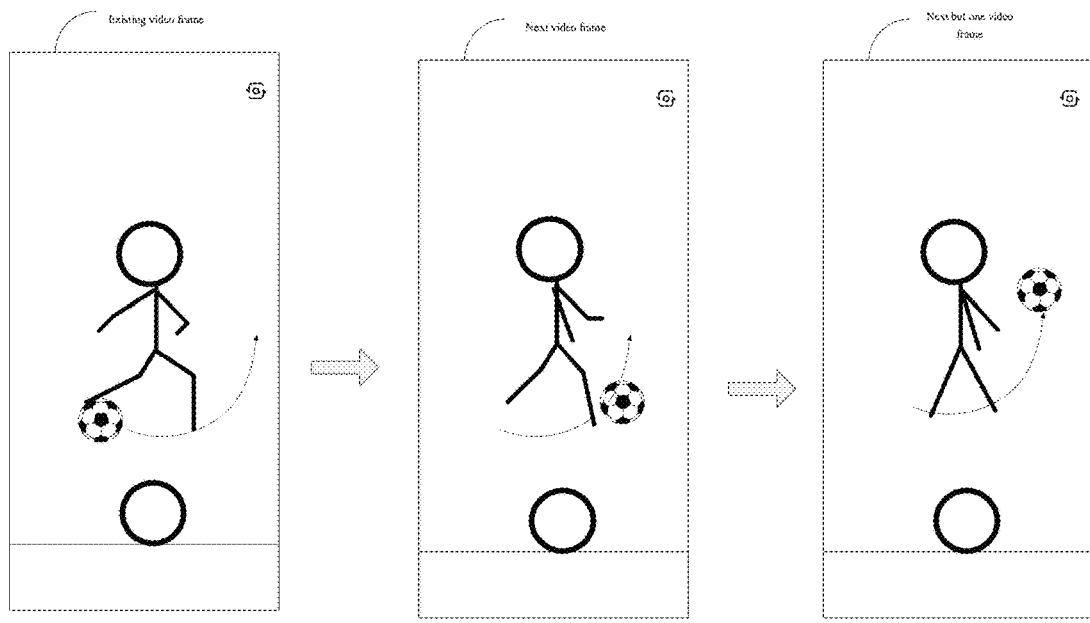
FIG. 8 is a schematic diagram of another touch animation display scene provided in an embodiment of the present disclosure.

For example, as shown in FIG. 8, when the motion mode includes the motion trail, the human body posture in the existing video frame is the "kicking posture", the target key point position is the "tiptoe", and the target object is the "football", the effect of adjusting the motion trail according to the touch direction and the touch force of the football under the "kicking posture" is: to control the motion trail of the "football" to simulate the motion trail of being "kicked".

Figure 9:
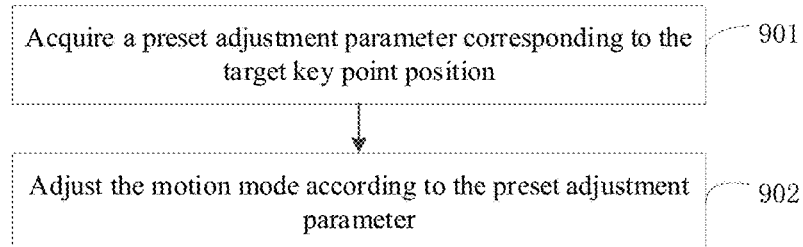
FIG. 9 is a flow schematic diagram of another touch animation display method provided in an embodiment of the present disclosure.

In another embodiment of the present disclosure, as shown in FIG. 9, the step of adjusting the motion mode of the target object according to the target key point position that satisfies the touch condition includes:

Step 901, a preset adjustment parameter corresponding to the target key point position is acquired.

Step 902, the motion mode is adjusted according to the preset adjustment parameter.

It may be understood that in this embodiment, the corresponding adjustment parameter is preset for the different human body key point positions, and the adjustment parameter includes but not limited to parameters that determine the motion mode, such as the motion trail direction and the motion speed.

In this embodiment, the preset adjustment parameter corresponding to the target key point position that satisfies the touch condition is acquired, and the motion mode is adjusted according to the preset adjustment parameter corresponding to the target key point position, thus the motion modes of the target object touching the different target key points are different.

Figure 10A:
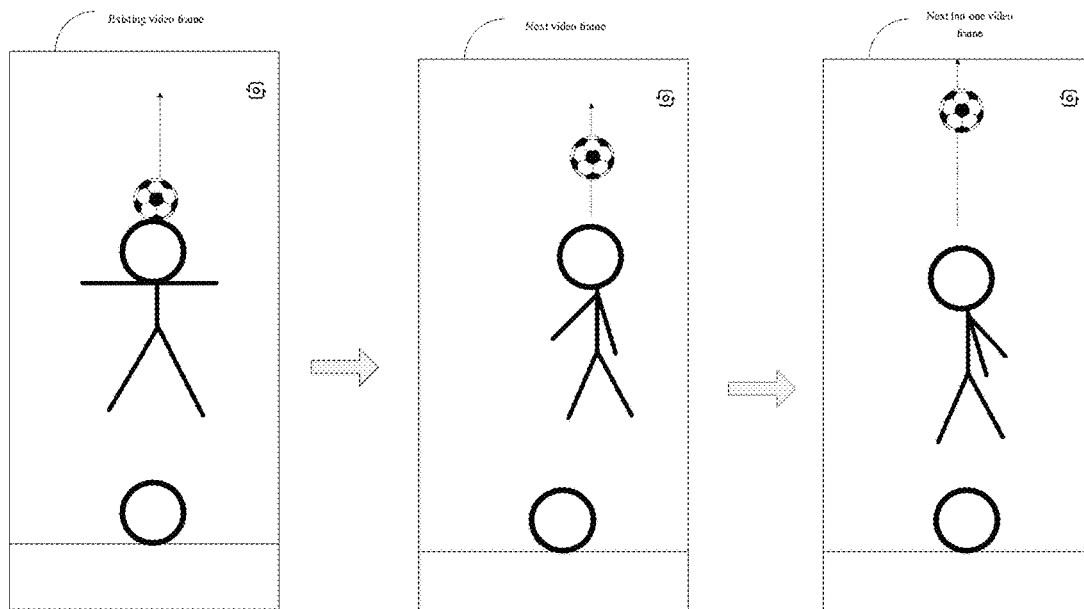
FIG. 10(a) is a schematic diagram of another touch animation display scene provided in an embodiment of the present disclosure.
Figure 10B:
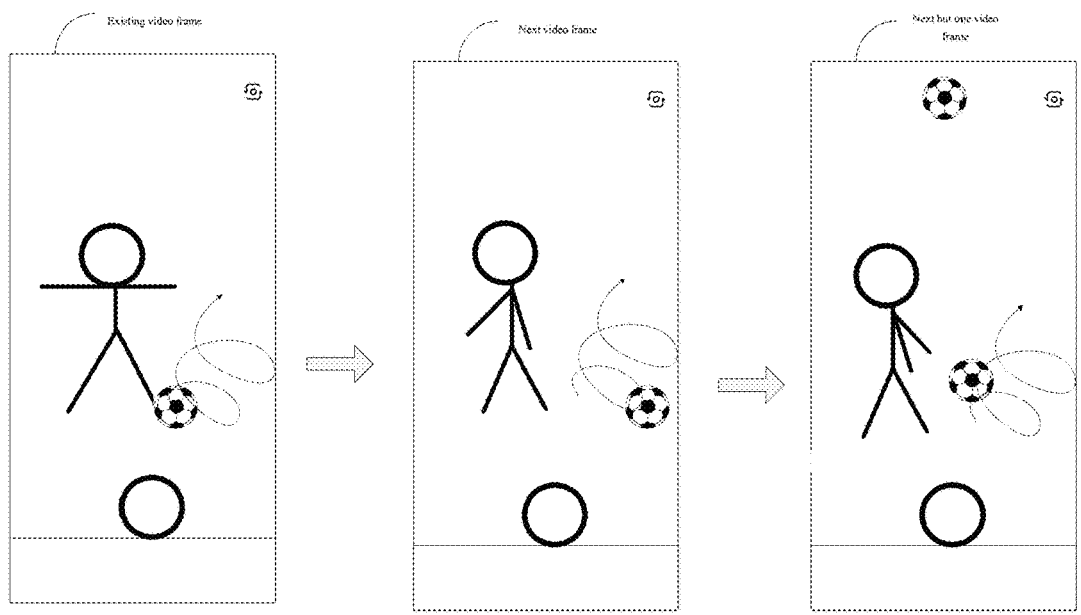
FIG. 10(b) is a schematic diagram of another touch animation display scene provided in an embodiment of the present disclosure.

For example, when the motion mode includes the motion trail, as shown in FIG. 10(*a*), when the target object is the "football" and the target key point position is a key point position of the head top, the motion trail adjusted according to the preset trail adjustment parameter corresponding to the head top is a motion trail of "upward bounce".

As shown in FIG. 10(*b*), when the target key point position is a position of a tiptoe key point, the motion trail adjusted according to the preset trail adjustment parameter corresponding to the tiptoe is a motion trail of "spiral flyout".

In conclusion, the touch animation display method in the embodiments of the present disclosure flexibly adjusts the motion mode corresponding to the target object according to the target key point position, the interestingness of the interaction between the user and the video is further improved, and stickiness between the user and a product is improved.

Based on the above embodiments, in order to further improve the interaction sense between the user and the video, in addition to simulating the touch motion mode of the target object, other animation effects may also be combined to improve the touch interestingness.

Figure 11:
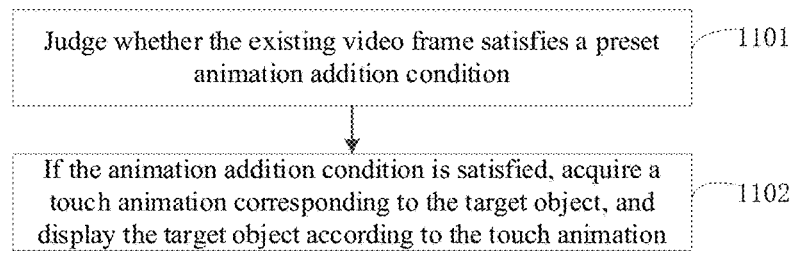
FIG. 11 is a flow schematic diagram of another touch animation display method provided in an embodiment of the present disclosure.

In an embodiment of the present disclosure, as shown in FIG. 11, after the touch condition is satisfied, the method further includes:

Step 1101, it is judged whether the existing video frame satisfies a preset animation addition condition.

In this embodiment, it is judged whether the existing video frame satisfies the preset animation addition condition, herein the preset animation addition condition is used to judge whether it is time to add a touch animation.

In an embodiment of the present disclosure, a number of video frames that satisfy the touch condition at present is counted.

In this embodiment, the number of the video frames that satisfy the touch condition in a corresponding video stream is counted until the existing video frame is played. For example, with a preset counter, the initial value of the counter is set as 0, and whenever a video frame with a target key point that satisfies the preset touch condition is encountered, the counter is processed by adding 1. Therefore, the number of the existing video frames that satisfy the touch condition may be acquired according to a counting result of the counter.

Furthermore, it is judged whether the number of the video frames is a preset animation addition number. Herein, the preset animation addition number may be a numerical range, such as the numerical range greater than or equal to 5, or some discrete values, such as "5", "10", and "15".

In another embodiment of the present disclosure, the corresponding touch animation may also be displayed after the video is already played for a certain duration, namely the video duration corresponding to the existing video frame is counted. For example, the playing sequence number of the existing video frame may be acquired, and the video duration is determined according to a product value of the display duration and the sequence number of each video frame. In this embodiment, if the video display duration exceeds a threshold, it is assumed that the existing video frame satisfies the preset animation addition condition.

Step 1102, if the animation addition condition is satisfied, a touch animation corresponding to the target object is acquired, and the target object is displayed according to the touch animation.

In this embodiment, if the animation addition condition is satisfied, the touch animation corresponding to the target object is acquired, and the target object is displayed according to the touch animation. Therefore, the more interesting animation addition effect is formed. Herein, the touch animation may correspond to the target object, as to improve display coordination. For example, when the target object is the "football", the corresponding touch animation is a "flame" and the like.

Certainly, in some possible examples, the touch animation may also correspond to the animation addition number. For example, when the preset animation addition number is "5", the corresponding touch animation is the "flame"; and for another example, when the preset animation addition number is "10", the corresponding touch animation is an "explosion" and the like.

Figure 12A:
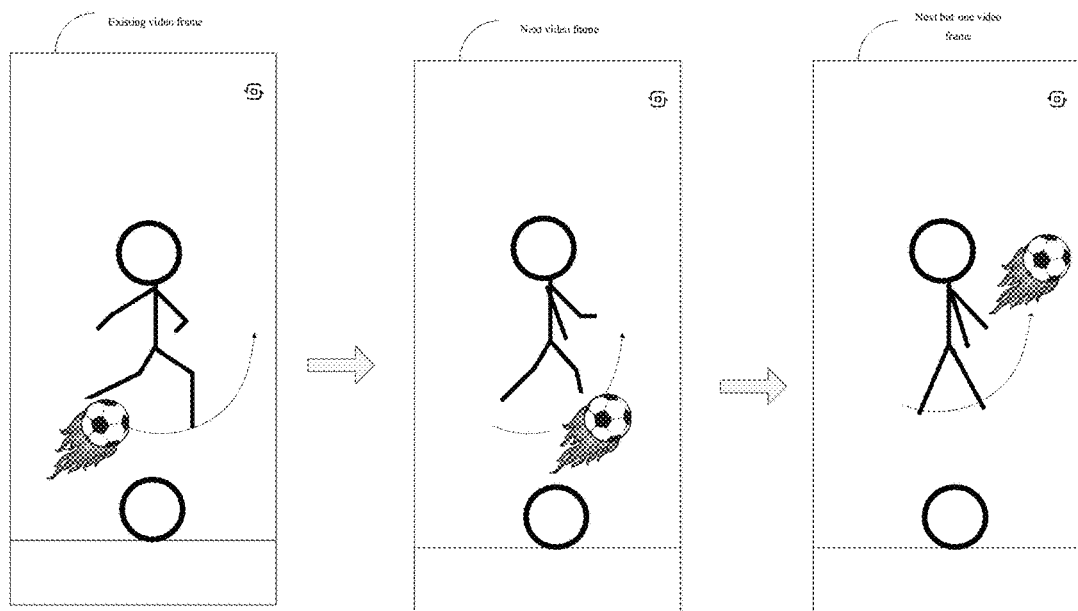
FIG. 12(a) is a schematic diagram of another touch animation display scene provided in an embodiment of the present disclosure.

In the actual executive process, when the object is displayed according to the motion mode adjusted, the touch animation may be added to the target object. For example, as shown in FIG. 12(a), if the corresponding touch animation is the "flame", and the target object is the football, a "football" motion trail with a "flame" effect is displayed in the video stream.

Figure 12B:
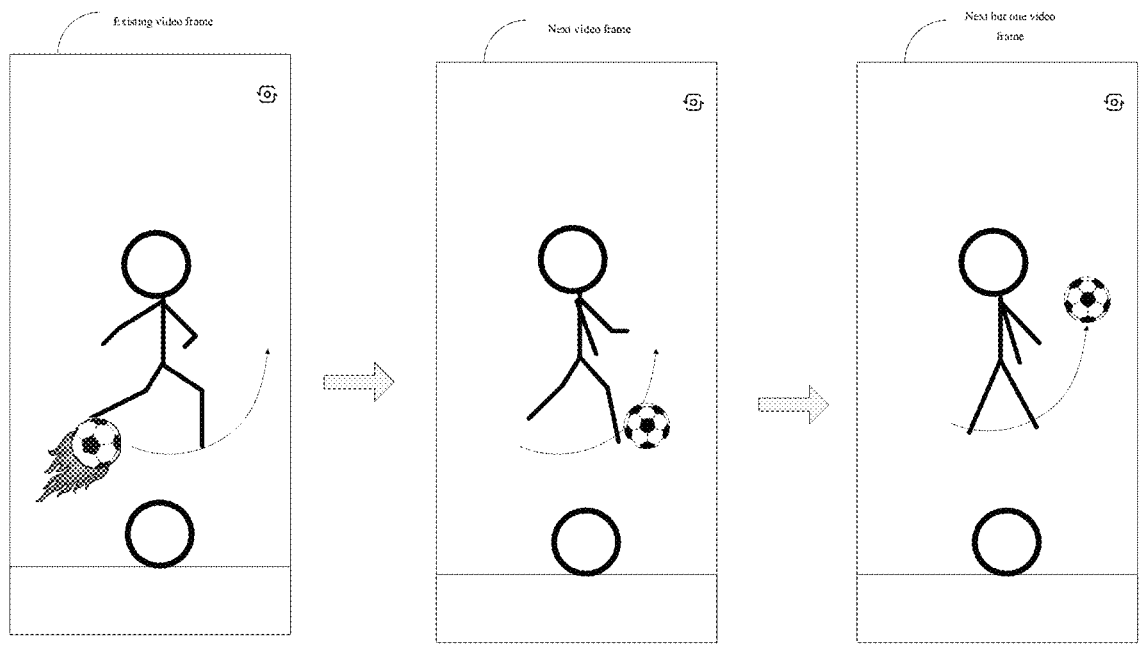
FIG. 12(b) is a schematic diagram of another touch animation display scene provided in an embodiment of the present disclosure.

For example, as shown in FIG. 12(b), if the corresponding touch animation is the "flame", the target key point position is the tiptoe, and the target object is the football, the "flame" effect is displayed when the "football" touches with the "tiptoe".

For another example, when the preset threshold is 10 seconds, after the video playing time is greater than 10 seconds, in addition to adjusting the motion mode, the target object is also displayed according to the preset touch animation for the touch situations, herein the preset touch animation may be set according to application scenes, including but not limited to an "explosion animation", a "firework animation", and the like.

Certainly, in other possible embodiments, the ending video frame corresponding to the motion mode adjusted may be determined, and the touch animation may be added to the target object in the ending video frame. For example, the total display duration corresponding to the motion mode adjusted and the display duration of each video frame are determined, and the ending video frame may be determined according to a ratio of the total display duration to the display duration, or the corresponding touch animation may only be displayed when the target object touches with the target key point.

In conclusion, the touch animation display method in the embodiments of the present disclosure may further enrich the touch effect by combining other animation effects, further improve the interestingness of video display, and improve the user's interaction experience.

In order to achieve the above embodiments, the present disclosure further provides a touch animation display apparatus.

Figure 13:
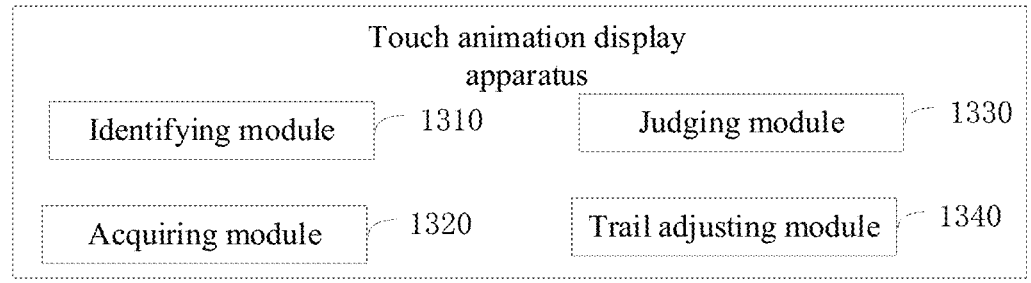
FIG. 13 is a structure schematic diagram of a touch animation display apparatus provided in an embodiment of the present disclosure.

FIG. 13 is a structure schematic diagram of a touch animation display apparatus provided in an embodiment of the present disclosure, and the apparatus may be achieved by software and/or hardware and may generally be integrated into an electronic device. As shown in FIG. 13, the apparatus includes: an identifying module 1310, an acquiring module 1320, a judging module 1330, and a trail adjusting module 1340, herein, the identifying module 1310 is used to identify a human body key point position on a human body in an existing video frame;

the acquiring module 1320 is used to, according to a predetermined motion mode, acquire a display position of a target object in the existing video frame;

the judging module 1330 is used to, according to the human body key point position and the display position, judge whether a preset touch condition is satisfied; and the trail adjusting module 1340 is used to adjust a motion mode of the target object according to a target key point position when the touch condition is satisfied, herein the target key point position is the human body key point position that satisfies the touch condition.

The touch animation display apparatus provided in the embodiments of the present disclosure may execute the touch animation display method provided in any one of the embodiments of the present disclosure, and has the corresponding functional modules for executing the method and beneficial effects.

In order to achieve the above embodiments, the present disclosure further provides a computer program product, including a computer program/instruction, and the computer program/instruction achieves the touch animation display method in the above embodiments when being executed by the processor.

Figure 14:
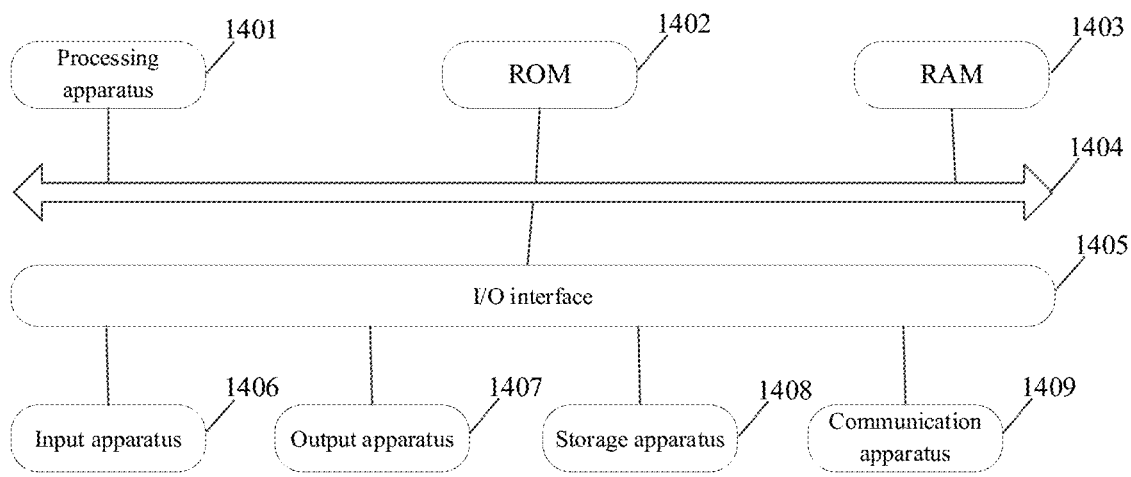
FIG. 14 is a structure schematic diagram of an electronic device provided in an embodiment of the present disclosure.

FIG. 14 is a structure schematic diagram of an electronic device provided in an embodiment of the present disclosure.

It is specifically described below with reference to FIG. 14, and it shows the structure schematic diagram suitable for achieving the electronic device 1400 in the embodiment of the present disclosure. The electronic device 1400 in the embodiment of the present disclosure may include but not limited to a mobile terminal such as a mobile phone, a notebook computer, a digital radio broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device shown in FIG. 14 is only an example and should not impose any limitations on the functions and use scopes of the embodiments of the present disclosure.

As shown in FIG. 14, the electronic device 1400 may include a processing apparatus (such as a central processing unit, and a graphics processor) 1401, it may execute various appropriate actions and processes according to a program stored in a read-only memory (ROM) 1402 or a program loaded from a storage apparatus 1408 to a random access memory (RAM) 1403. In RAM 1403, various programs and data required for operations of the electronic device 1400 are also stored. The processing apparatus 1401, ROM 1402, and RAM 1403 are connected to each other by a bus 1404. An input/output (I/O) interface 1405 is also connected to the bus 1404.

Typically, the following apparatuses may be connected to the I/O interface 1405: an input apparatus 1406 such as a touch screen, a touchpad, a keyboard, a mouse, a camera, a microphone, an accelerometer, and a gyroscope; an output apparatus 1407 such as a liquid crystal display (LCD), a loudspeaker, and a vibrator; a storage apparatus 1408 such as a magnetic tape, and a hard disk drive; and a communication apparatus 1409. The communication apparatus 1409 may allow the electronic device 1400 to wireless-communicate or wire-communicate with other devices so as to exchange data. Although FIG. 14 shows the electronic device 1400 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 1409, or installed from the storage apparatus 1408, or installed from ROM 1402. When the computer program is executed by the processing apparatus 1401, the above functions defined in the touch animation display method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above computer-readable medium may be contained in the above electronic device; and it may also exist separately without being assembled into the electronic device.

The above computer-readable medium carries one or more programs, and when the above one or more programs are executed by the electronic device, the electronic device: identifies the human body key point position on the human body in the existing video frame; according to the predetermined motion mode, acquires the display position of the target object in the existing video frame; according to the human body key point position and the display position, judges whether the preset touch condition is satisfied; and if the touch condition is satisfied, adjusts the motion mode of the target object according to the target key point position, herein the target key point position is the human body key point position that satisfies the touch condition. Therefore, by displaying the target object in the video frame, the touch motion during interaction with the user is simulated in real time, the interestingness of video display is improved, and the user's interaction experience is improved.

The computer program code for executing the operation of the present disclosure may be written in one or more programming languages or combinations thereof, the above programming language includes but not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, the present disclosure provides a touch animation display method, including:
- a human body key point position on a human body in an existing video frame is identified;
- according to a predetermined motion mode, a display position of a target object in the existing video frame is acquired;
- according to the human body key point position and the display position, it is judged whether a preset touch condition is satisfied; and
- if the touch condition is satisfied, a motion mode of the target object is adjusted according to a target key point position, herein the target key point position is the human body key point position that satisfies the touch condition.

According to one or more embodiments of the present disclosure, in the touch animation display method provided by the present disclosure, after the step of judging whether the preset touch condition is satisfied, further including:
- if the touch condition is not satisfied, a motion of the target object is controlled according to the predetermined motion mode.

According to one or more embodiments of the present disclosure, in the touch animation display method provided by the present disclosure, before the step of identifying the human body key point position on the human body in the existing video frame, further including: a target body is determined; and the target object is acquired according to the target body.

According to one or more embodiments of the present disclosure, in the touch animation display method provided by the present disclosure, the step of acquiring the target object according to the target body, including:
- a target image containing the target body is acquired; and
- an image area in which the target body is located in the target image is extracted as the target object.

According to one or more embodiments of the present disclosure, in the touch animation display method provided by the present disclosure, before the step of identifying the human body key point position on the human body in the existing video frame, further including:
- a facial image in the existing video frame is identified;
- a preset facial database is queried to obtain a target object corresponding to the facial image; or,
- a scene type in the existing video frame is identified; and
- a preset scene database is queried to obtain a target object corresponding to the scene type.

According to one or more embodiments of the present disclosure, in the touch animation display method provided by the present disclosure, the step of, according to the human body key point position and the display position, judging whether the preset touch condition is satisfied, including:
- it is determined whether the human body key point position is coincided with the display position;
- if so, the preset touch condition is satisfied; and
- if not, the preset touch condition is not satisfied.

According to one or more embodiments of the present disclosure, in the touch animation display method provided by the present disclosure, before the step of determining whether the human body key point position is coincided with the display position, the method further includes:
- a human body posture is determined according to all of the human body key point positions;
- the step of determining whether the human body key point position is coincided with the display position, including:
  - when it is determined that the human body posture belongs to a preset human body posture, it is determined whether the human body key point position is coincided with the display position.

According to one or more embodiments of the present disclosure, in the touch animation display method provided by the present disclosure, the step of adjusting the motion mode of the target object according to the target key point position that satisfies the touch condition, including:
- a touch direction is determined according to the human body posture and the target key point position;
- a historical key point position corresponding to the target key point position in a previous video frame is acquired;
- a displacement between the historical key point position and the target key point position is calculated, and a touch force is determined according to the displacement; and
- a motion direction is adjusted according to the touch direction, and a motion speed is adjusted according to the touch force.

According to one or more embodiments of the present disclosure, in the touch animation display method provided by the present disclosure, the step of adjusting the motion mode of the target object according to the target key point position, including:
- a preset adjustment parameter corresponding to the target key point position is acquired; and
- the motion mode is adjusted according to the preset adjustment parameter.

According to one or more embodiments of the present disclosure, in the touch animation display method provided by the present disclosure, when the touch condition is satisfied, the method further includes:
- it is judged whether the existing video frame satisfies a preset animation addition condition; and
- if the preset animation addition condition is satisfied, a touch animation corresponding to the target object is acquired, and the target object is displayed according to the touch animation.

According to one or more embodiments of the present disclosure, in the touch animation display method provided by the present disclosure, the step of judging whether the existing video frame satisfies the preset animation addition condition, including:
- a number of video frames that satisfy the touch condition at present is counted;
- it is judged whether the number of the video frames is a preset animation addition number; or,
- a video duration corresponding to the existing video frame is counted; and
- it is judged whether the video duration exceeds a preset threshold.

According to one or more embodiments of the present disclosure, in the touch animation display method provided by the present disclosure, the step of displaying the target object according to the touch animation, including:
- when the target object is displayed according to the motion mode adjusted, the touch animation is added to the target object; or, an ending video frame corresponding to the motion mode adjusted is determined, and the touch animation is added to the target object in the ending video frame.

According to one or more embodiments of the present disclosure, in the touch animation display method provided by the present disclosure, the motion mode includes:

one or more of a motion direction, a motion trail, and a motion speed.

According to one or more embodiments of the present disclosure, the present disclosure provides a touch animation display apparatus, including:

an identifying module, used to identify a human body key point position on a human body in an existing video frame;

an acquiring module, used to, according to a predetermined motion mode, acquire a display position of a target object in the existing video frame;

a judging module, used to, according to the human body key point position and the display position, judge whether a preset touch condition is satisfied; and a trail adjusting module, used to adjust a motion mode of the target object according to a target key point position when the touch condition is satisfied, herein the target key point position is the human body key point position that satisfies the touch condition.

According to one or more embodiments of the present disclosure, in the touch animation display apparatus provided by the present disclosure, the trail adjusting module is further used to: when the touch condition is not satisfied, control a motion of the target object according to the predetermined motion mode.

According to one or more embodiments of the present disclosure, in the touch animation display apparatus provided by the present disclosure, further including:

a determining module, used to determine a target body;

a first target object acquiring module, used to acquire the target object according to the target body.

According to one or more embodiments of the present disclosure, in the touch animation display apparatus provided by the present disclosure, the first target object acquiring module is specifically used to:

acquire a target image containing the target object, and extract an image area in which the target body is located in the target image as the target object.

According to one or more embodiments of the present disclosure, in the touch animation display apparatus provided by the present disclosure, further including: a second target object acquiring module, herein the second target object acquiring module is used to:

identify a facial image in the existing video frame;
query a preset facial database to obtain a target object corresponding to the facial image; or,
identify a scene type in the existing video frame; and
query a preset scene database to obtain a target object corresponding to the scene type.

According to one or more embodiments of the present disclosure, in the touch animation display apparatus provided by the present disclosure, the judging module is specifically used to:

determine whether the human body key point position is coincided with the display position;
if so, the preset touch condition is satisfied; and
if not, the preset touch condition is not satisfied.

According to one or more embodiments of the present disclosure, in the touch animation display apparatus provided by the present disclosure, further including:

a first determining module, used to determine a human body posture according to all of the human body key point positions; and a second determining module, used to, when it is determined that the human body posture belongs to a preset human body posture, determine whether the human body key point position is coincided with the display position.

According to one or more embodiments of the present disclosure, in the touch animation display apparatus provided by the present disclosure, the trail adjusting module is specifically used to:

determine a touch direction according to the human body posture and the target key point position;
acquire a historical key point position corresponding to the target key point position in a previous video frame;
calculate a displacement between the historical key point position and the target key point position, and determine a touch force according to the displacement; and
adjust a motion direction according to the touch direction, and adjust a motion speed according to the touch force.

According to one or more embodiments of the present disclosure, in the touch animation display apparatus provided by the present disclosure, the trail adjusting module is specifically used to:

acquire a preset adjustment parameter corresponding to the target key point position that satisfies the touch condition;
adjust the motion mode according to the preset adjustment parameter.

According to one or more embodiments of the present disclosure, in the touch animation display apparatus provided by the present disclosure, further including:

the judging module, used to judge whether the existing video frame satisfies a preset animation addition condition; and
a display module, used to, if the preset animation addition condition is satisfied, acquire a touch animation corresponding to the target object, and display the target object according to the touch animation.

According to one or more embodiments of the present disclosure, in the touch animation display apparatus provided by the present disclosure, the judging module is specifically used to:

count a number of video frames that satisfy the touch condition at present;
judge whether the number of the video frames is a preset animation addition number; or,
count a video duration corresponding to the existing video frame; and
judge whether the video duration exceeds a preset threshold.

According to one or more embodiments of the present disclosure, in the touch animation display apparatus provided by the present disclosure, the display module is specifically used to:

when the target object is displayed according to the motion mode adjusted, add the touch animation to the target object; or,
determine an ending video frame corresponding to the motion mode adjusted, and add the touch animation to the target object in the ending video frame.

According to one or more embodiments of the present disclosure, in the touch animation display apparatus provided by the present disclosure, the motion mode includes:

one or more of a motion direction, a motion trail, and a motion speed.

According to one or more embodiments of the present disclosure, the present disclosure provides an electronic device, including:
- a processor; and
- a memory used to store an executable instruction of the processor;
- herein the processor is used to read the executable instruction from the memory and execute the instruction to achieve any one touch animation display method provided by the present disclosure.

According to one or more embodiments of the present disclosure, the present disclosure provides a computer-readable storage medium, the storage medium stores a computer program, and the computer program is used to execute any one touch animation display method provided by the present disclosure.

The above descriptions are only preferred embodiments of the present disclosure and explanation of the technical principles used. Those skilled in the art should understand that the involved scope of the present disclosure is not limited to the technical schemes formed by specific combinations of the aforementioned technical features, but also encompasses other technical schemes formed by arbitrary combinations of the aforementioned technical features or equivalent features thereof without departing from the aforementioned disclosed concepts. For example, a technical scheme formed by replacing the above features with (but not limited to) the technical features with the similar functions disclosed in the present disclosure.

In addition, although each operation is depicted in a specific order, this should not be understood as requiring these operations to be executed in the specific order shown or in a sequential order. In a certain environment, multi-tasking and parallel processing may be advantageous. Similarly, although a plurality of specific implementation details are included in the above discussion, these should not be explained as limiting the scope of the present disclosure. Some features described in the context of a single embodiment may also be combined to achieve in the single embodiment. On the contrary, various features described in the context of the single embodiment may also be achieved individually or in any suitable sub-combination in a plurality of the embodiments.

Although the subject matter is already described in the languages specific to structural features and/or method logical actions, it should be understood that the subject matter limited in the appended claims may not necessarily be limited to the specific features or actions described above. On the contrary, the specific features and actions described above are only exemplary forms of achieving the claims.

The invention claimed is:

1. A touch animation display method, characterized in that the method comprises:
   - taking a photo of a target body in a real scene as a target image, wherein an image area in which the target body is located in the target image is extracted as a target object;
   - identifying a human body key point position on a human body in an existing video frame;
   - according to a predetermined motion mode, acquiring a display position of the target object in the existing video frame;
   - according to the human body key point position in the existing video frame and the display position of the target object extracted from the target image of the real scene, judging whether a preset touch condition is satisfied; and
   - if the touch condition is satisfied, adjusting a motion mode of the target object according to a target key point position, wherein the target key point position is the human body key point position that satisfies the touch condition.

2. The method of claim 1, characterized in that after the step of judging whether the preset touch condition is satisfied, the method further comprises:
   - if the touch condition is not satisfied, controlling a motion of the target object continuously according to the predetermined motion mode.

3. The method of claim 1, characterized in that before the step of acquiring the display position of the target object in the existing video frame, the method further comprises:
   - identifying a facial image in the existing video frame; and
     querying a preset facial database to obtain a target object corresponding to the facial image; or
   - identifying a scene type in the existing video frame; and
     querying a preset scene database to obtain a target object corresponding to the scene type.

4. The method of claim 1, characterized in that the step of, according to the human body key point position and the display position, judging whether the preset touch condition is satisfied, further comprises:
   - determining whether the human body key point position is coincided with the display position;
     if so, the preset touch condition is satisfied; and
     if not, the preset touch condition is not satisfied; or
   - determining whether a distance between the human body key point position and the display position is less than or equal to a radius corresponding to the target key point;
     if so, the preset touch condition is satisfied; and
     if not, the preset touch condition is not satisfied.

5. The method of claim 4, characterized in that
   before the step of determining whether the human body key point position is coincided with the display position, the method further comprises:
   - determining a human body posture according to all of the human body key point positions; and
   the step of determining whether the human body key point position is coincided with the display position further comprises:
   - when it is determined that the human body posture belongs to a preset human body posture, determining whether the human body key point position is coincided with the display position.

6. The method of claim 5, characterized in that the step of adjusting the motion mode of the target object according to the target key point position further comprises:
   - determining a touch direction according to the human body posture and the target key point position;
   - acquiring a historical key point position corresponding to the target key point position in a previous video frame;
   - calculating a displacement between the historical key point position and the target key point position, and determining a touch force according to the displacement; and
   - adjusting a motion direction according to the touch direction, and adjusting a motion speed according to the touch force.

7. The method of claim 1, characterized in that the step of adjusting the motion mode of the target object according to the target key point position further comprises:
   - acquiring a preset adjustment parameter corresponding to the target key point position; and adjusting the motion mode according to the preset adjustment parameter.

8. The method of claim 1, characterized in that when the touch condition is satisfied, the method further comprises:
   judging whether the existing video frame satisfies a preset animation addition condition; and
   if the preset animation addition condition is satisfied, acquiring a touch animation corresponding to the target object, and displaying the target object according to the touch animation.

9. The method of claim 8, characterized in that the step of determining whether the existing video frame satisfies the preset animation addition condition further comprises:
   counting a number of video frames that satisfy the touch condition at present; and
judging whether the number of the video frames is a preset animation addition number; or
   counting a video duration corresponding to the existing video frame; and judging whether the video duration exceeds a preset threshold.

10. The method of claim 8, characterized in that the step of displaying the target object according to the touch animation further comprises:
    when displaying the target object according to the motion mode adjusted, adding the touch animation to the target object; or
    determining an ending video frame corresponding to the motion mode adjusted, and adding the touch animation to the target object in the ending video frame.

11. The method of claim 9, characterized in that the step of displaying the target object according to the touch animation further comprises:
    when displaying the target object according to the motion mode adjusted, adding the touch animation to the target object; or
    determining an ending video frame corresponding to the motion mode adjusted, and adding the touch animation to the target object in the ending video frame.

12. The method of claim 1, characterized in that the motion mode comprises:
one or more of a motion direction, a motion trail, and a motion speed.

13. An electronic device, characterized in that the electronic device comprises:
    a processor; and
    a memory used to store an executable instruction of the processor;
    wherein the processor is used to read the executable instruction from the memory and execute the instruction to achieve the touch animation display method of claim 1.

14. A non-transitory computer-readable storage medium, having executable programming instructions stored thereon, wherein the instructions, upon execution by a processor, cause the processor to execute the touch animation display method of claim 1.

15. A touch animation display apparatus, characterized by comprising:
    a first target object acquiring circuit, configured to take a photo of a target body in a real scene as a target image, wherein an image area in which the target body is located in the target image is extracted as a target object;
    an identifying circuit, configured to identify a human body key point position on a human body in an existing video frame;
    an acquiring circuit, configured to, according to a predetermined motion mode, acquire a display position of a target object in the existing video frame;
    a judging circuit, configured to, according to the human body key point position in the existing video frame and the display position of the target object extracted from the target image of the real scene, judge whether a preset touch condition is satisfied; and
    a trail adjusting circuit, configured to adjust a motion mode of the target object according to a target key point position when the touch condition is satisfied, wherein the target key point position is the human body key point position that satisfies the touch condition.

* * * * *